(12) United States Patent
Carnevali

(10) Patent No.: US 9,568,145 B2
(45) Date of Patent: Feb. 14, 2017

(54) FLEX BASE WITH BALL MOUNT

(71) Applicant: Jeffrey D. Carnevali, Seattle, WA (US)

(72) Inventor: Jeffrey D. Carnevali, Seattle, WA (US)

( * ) Notice: Subject to any disclaimer, the term of this patent is extended or adjusted under 35 U.S.C. 154(b) by 88 days.

(21) Appl. No.: 14/046,997

(22) Filed: Oct. 6, 2013

(65) Prior Publication Data

US 2014/0034794 A1 Feb. 6, 2014

Related U.S. Application Data

(63) Continuation-in-part of application No. 12/589,744, filed on Oct. 28, 2009.

(51) Int. Cl.
| | |
|---|---|
| *F16M 13/02* | (2006.01) |
| *F16M 11/04* | (2006.01) |
| *F16M 11/14* | (2006.01) |
| *F16M 13/00* | (2006.01) |

(52) U.S. Cl.
CPC ............ *F16M 13/02* (2013.01); *F16M 11/041* (2013.01); *F16M 11/14* (2013.01); *F16M 13/00* (2013.01); *F16M 13/022* (2013.01)

(58) Field of Classification Search
USPC ....... 248/288.31, 179.1, 181.1, 181.2, 182.1; 403/144, 122, 127, 132, 133, 136, 138
See application file for complete search history.

(56) References Cited

U.S. PATENT DOCUMENTS

| | | | | |
|---|---|---|---|---|
| 5,050,836 | A * | 9/1991 | Makous | E05B 73/0005 248/553 |
| 5,454,652 | A * | 10/1995 | Huellemeier et al. | 400/489 |
| 6,328,347 | B1 * | 12/2001 | Reder et al. | 285/261 |
| 6,840,487 | B2 * | 1/2005 | Carnevali | 248/346.06 |
| 7,665,875 | B2 * | 2/2010 | Whitman | 362/572 |
| 7,731,140 | B2 * | 6/2010 | Carnevali | 248/221.11 |
| 2002/0166936 | A1 * | 11/2002 | Carnevali | 248/288.31 |
| 2003/0180088 | A1 * | 9/2003 | Carnevali | 403/56 |

* cited by examiner

*Primary Examiner* — Steven Marsh
(74) *Attorney, Agent, or Firm* — Charles J. Rupnick Attorney at Law

(57) ABSTRACT

A ball mount device, formed on a rigid non-metallic frame having an upright columnar stem portion projected from a circular transverse base portion, and an enlarged connector core on the upright stem portion distal of the base portion. A first elastomeric material is molded over the connector core distal of the base portion and forms a smooth part-spherical outer surface. A second elastomeric material is molded over the base portion and forms a pliantly conformable outer skirt portion extending outwardly thereof with a smooth and substantially flat and circular outer surface opposite from the stem portion. A pressure sensitive adhesive is provided on the outer surface of the elastomeric material coating the base portion for adhering the ball mount device to a mounting surface that is external of the ball mount device.

20 Claims, 10 Drawing Sheets

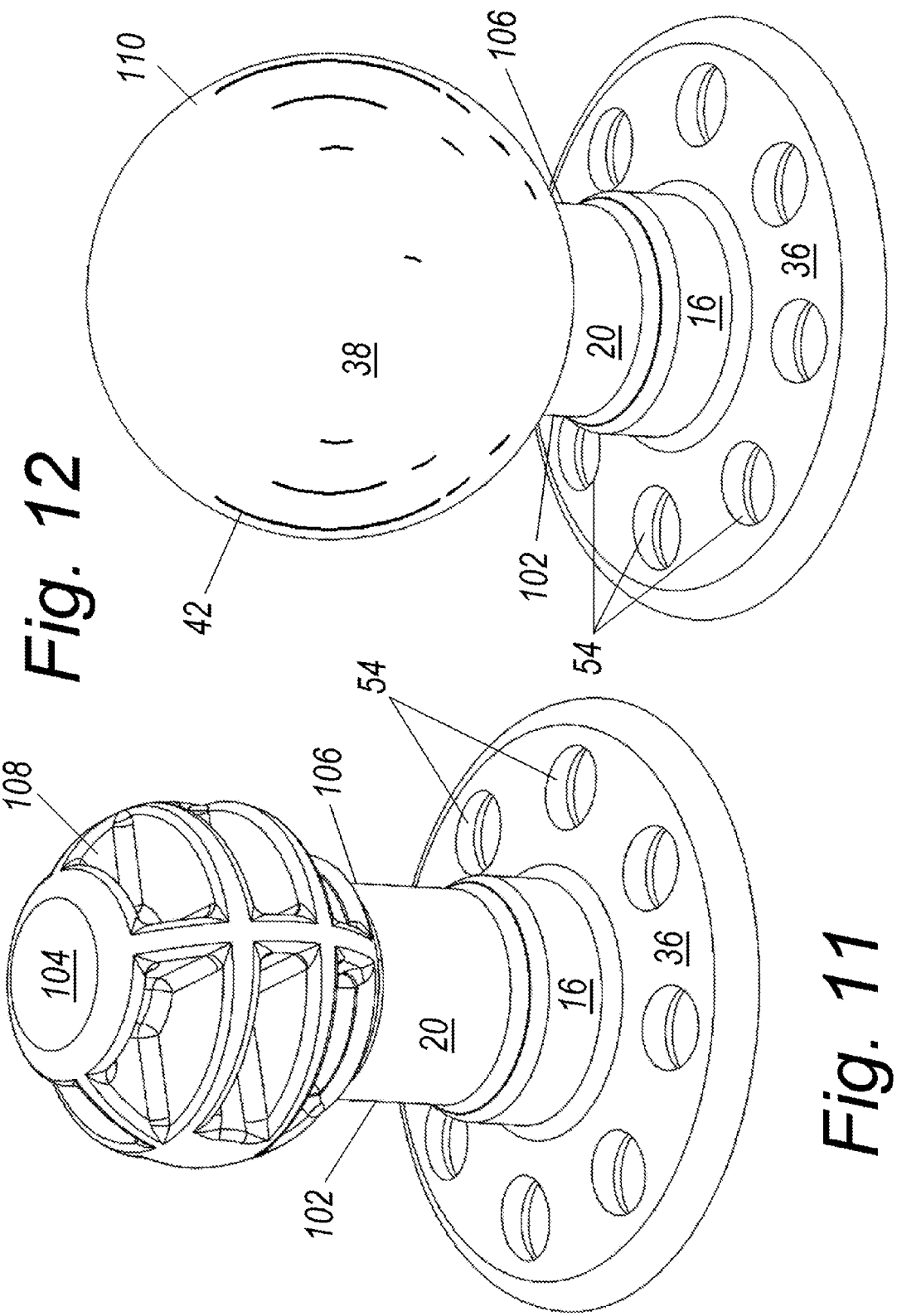

FLEX BASE WITH BALL MOUNT

CONTINUATION-IN-PART

This application is a Continuation-in-part and claims priority benefit of copending parent U.S. patent application Ser. No. 12/589,744 filed in the name of Jeffrey D. Carnevali, the sole inventor hereof, on Oct. 28, 2009, the complete disclosure of which is incorporated herein by reference.

FIELD OF THE INVENTION

The present invention relates generally to flexible mounting apparatus and particularly, to molded plastic interconnecting ball-and-socket elements in combination with a universally mountable base interconnected thereto.

BACKGROUND OF THE INVENTION

Flexible mounting apparatus formed of interconnecting ball-and-socket elements are generally well-known. Such apparatus are easily adjustable and widely used for holding relatively light external loads.

However, known interconnecting ball-and-socket elements are difficult to adhere to nonplanar surfaces and are furthermore prone to slippage and failure over time.

SUMMARY OF THE INVENTION

The present invention is a ball mount device, formed on a rigid non-metallic frame having an upright columnar stem portion projected from a circular transverse base portion, and an enlarged connector core on the upright stem portion distal of the base portion. A first elastomeric material is molded over the connector core distal of the base portion and forms a smooth part-spherical outer surface. A second elastomeric material is molded over the base portion and forms a pliantly conformable outer skirt portion extending outwardly thereof with a smooth and substantially flat and circular outer surface opposite from the stem portion. A pressure sensitive adhesive is provided on the outer surface of the elastomeric material coating the base portion for adhering the ball mount device to a mounting surface that is external of the ball mount device.

A method for forming the ball mount device is also disclosed.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 illustrates one exemplary embodiment of a rigid frame for forming the alternative novel mounting apparatus of FIG. 10, wherein the rigid frame is formed of an upright stem portion projected from a transverse base portion that is structured for having the elastomeric material coating overmolded thereon for forming the pliantly conformable mounting pad, and wherein the upright stem portion is formed with a crown core;

FIG. 12 illustrates the rigid frame of FIG. 11 with an elastomeric material coating being presented on an end portion of the upright stem, thereby forming a male ball connector over a connector core positioned at the end portion of the reduced neck portion of the upright stem opposite from the mounting base;

DETAILED DESCRIPTION OF PREFERRED EMBODIMENT

In the Figures, like numerals indicate like elements.

Figure 1:
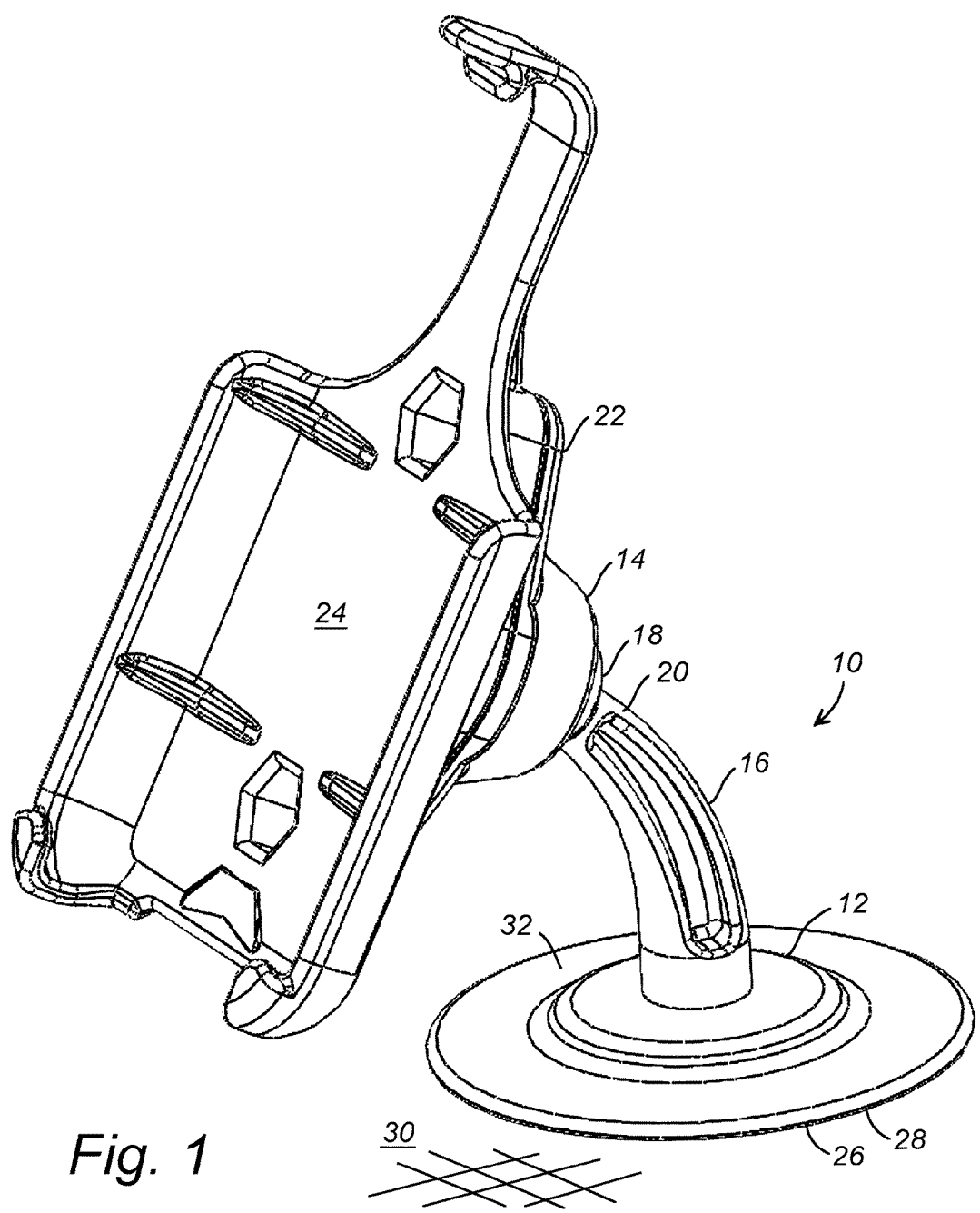
FIG. 1 is a perspective view showing an example of a novel mounting apparatus having interconnectable articulated elements.

FIG. 1 illustrates a novel mounting apparatus 10 having interconnectable articulated elements, the interconnectable articulated elements including a mounting base 12 and a connector base 14. Connector base 14 is spaced away from mounting base 12 by a substantially rigid column 16. A ball-and-socket joint 18 is formed between mounting base 12 and connector base 14. For example, ball-and-socket joint 18 is formed between connector base 14 and a reduced neck portion 20 of column 16 distal from mounting base 12. Connector base 14 includes a mounting plate 22 for mounting an external object 24, such as but not limited to an instrument cradle.

Mounting base 12 includes a mounting pad 32 having means 26 on it's under surface 28 for coupling to a mounting surface 30 external of mounting apparatus 10. By example and without limitation, coupling means 26 is a coupling agent such as an adhesive. For example, coupling means 26 is a conventional pressure sensitive adhesive, or PSA, of a type which forms a bond when pressure is applied to marry the adhesive with the adhered.

Figure 2:
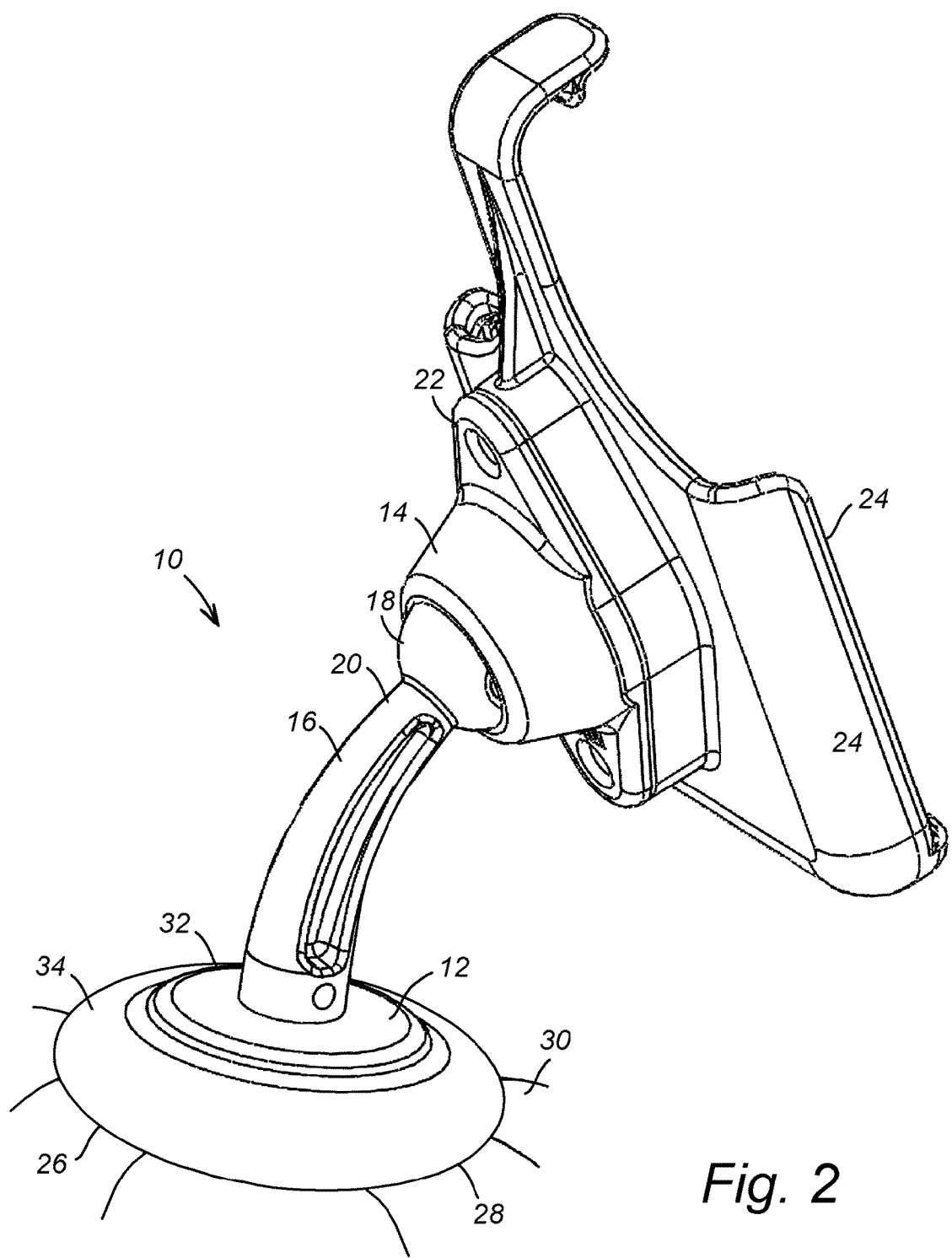
FIG. 2 illustrates the novel mounting apparatus having a pliantly conformable mounting pad which is flexible for substantially conforming to curved or other substantially nonplanar mounting surface.

FIG. 2 illustrates mounting base 12 having a mounting pad 32 with a pliantly conformable outer skirt portion 34 which is flexible for substantially conforming to mounting surface 30 external of mounting apparatus 10 when surface 30 is a curved or other substantially nonplanar mounting surface, such as vehicle dashboard or other nonplanar surface. When conformable outer skirt portion 34 is conformed to nonplanar external surface 30, mounting pad 32 is adhered to surface 30 by coupling means 26 on its under surface 28.

Figure 3:
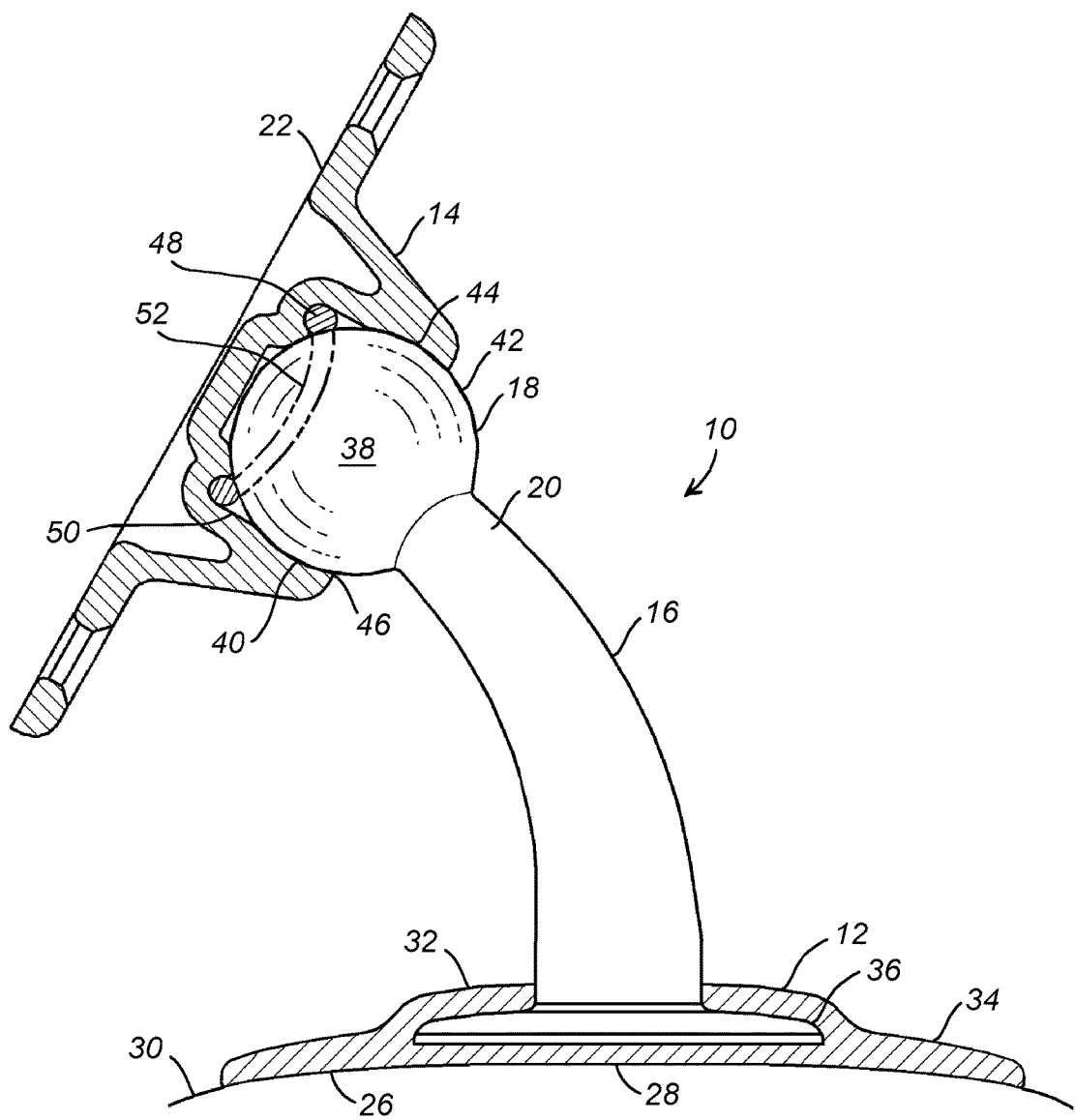
FIG. 3 illustrates a novel ball-and-socket joint of the a novel mounting apparatus.

FIG. 3 illustrates mounting pad 32 of mounting base 12 having pliantly conformable outer skirt portion 34 (shown in cross-section) configured as a substantially flexible material. Mounting pad 32 is coupled to a substantially rigid foot 36 of mounting base 12 adjacent to one end of column 16. For example, mounting pad 32 is adhered to foot 36, or mounting pad 32 is overmolded onto foot 36.

FIG. 3 also illustrates ball-and-socket joint 18 between mounting base 12 and connector base 14, wherein a male ball connector 38 is presented on reduced neck portion 20 of column 16 opposite from mounting base 12. Ball-and-socket joint 18 between mounting base 12 and connector base 14 is formed of interconnectable articulated inserting and receiving elements: the inserting element being a substantially spherically convexly curved male ball connector 38, and the receiving element being a complementary substantially spherically concavely curved female socket 40 adapted to receive male ball connector 38. Male ball connector 38 is formed of a substantially incompressible material with a part-spherical outer surface 42, and female socket 40 is formed with a part-spherical inner surface 44 communicating with an opening 46 thereinto. Part-spherical inner surface 44 of female socket 40 fits slideably over part-spherical outer surface 42 of male ball connector 38. Male ball connector 38 is more resistant to radial deformation than female socket 40, whereby male ball connector 38 is received within female socket 40 through opening 46 with a snap fit which provides load bearing support for loads transmitted through connector base 14. However, when male ball connector 38 is engaged in female socket 40, ball-and-socket joint 18 is capable of unlimited axial rotation and limited universal radial movement within limits of size differential between reduced neck portion 20 of column 16 and socket opening 46.

Additionally, one or more areas of interference contact are provided between male ball connector inserting element 38 and female socket receiving element 40. Here, an elastically compressible biasing member 48, such as an o-ring or compression spring, is provided between male ball connector 38 and female socket 40. Biasing member 48 is compressed by insertion force of male ball connector 38 being inserted into female socket 40, and the compression of biasing member 48 is maintained by socket opening 46 being closed about outer surface 42 of male ball connector 38. Accordingly, biasing member 48 compresses outer surface 42 of male ball connector 38 against inner surface 44 of female socket 40 that forms a snug fit of male ball connector 38 within female socket 40, which results in frictional forces between outer surface 42 of male ball connector 38 and inner surface 44 of female socket 40 that resists both rotational and radial movement of ball-and-socket joint 18.

Furthermore, when biasing member 48 is an elastically compressible elastomeric o-ring, surface friction between partially compressed o-ring biasing member 48 and outer surface 42 also resists movement of male ball connector 38 within female socket 40.

A seat 50 is provided for biasing member 48 for maintaining relative positioning against drag caused by movement of male ball connector 38 within female socket 40. By example and without limitation, seat 50 is formed in inner surface 44 of female socket 40. Connector base 14 (shown in cross-section) is formed with seat 50 as a groove sized to receive o-ring biasing member 48 to a depth that retains relative positioning of o-ring biasing member 48, yet causes a portion of o-ring biasing member 48 to partially protrude into female socket 40. The protruding portion of o-ring biasing member 48 engages outer surface 42 of male ball connector 38 and is compressed thereby. Accordingly, protruding portion of o-ring biasing member 48 forms a substantially circular area 52 (phantom lines) of interference contact with outer surface 42 of engaged male ball connector 38 wherein frictional drag occurs.

Figure 4:
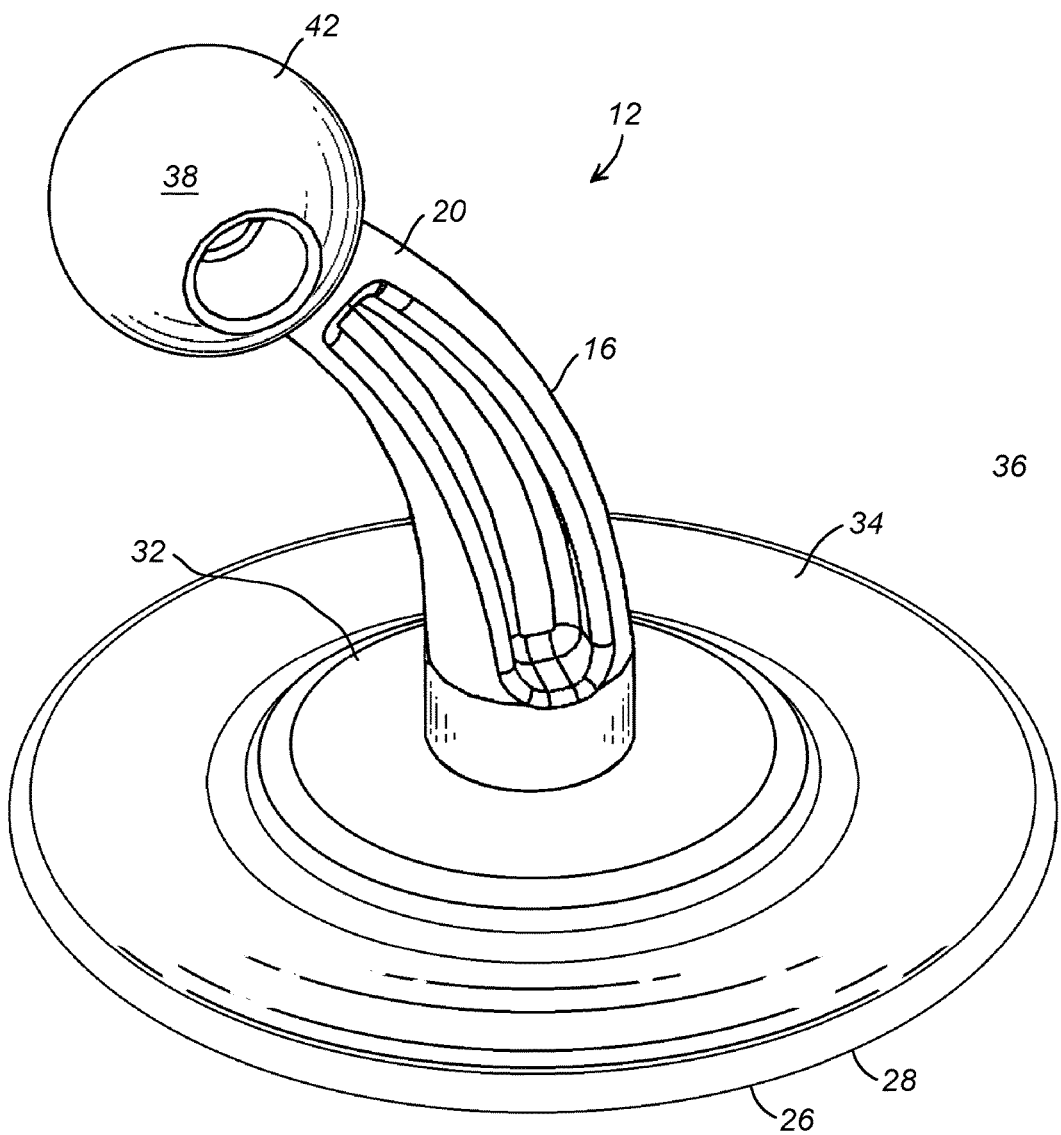
FIG. 4 is a view of a mounting base portion of the novel mounting apparatus having a pliantly conformable mounting pad.

FIG. 4 is a view of mounting base 12 having overmolded mounting pad 32 adjacent to one end of column 16, and male ball connector 38 presented on reduced neck portion 20 at other end of column 16 distal from mounting base 12.

Figure 5:
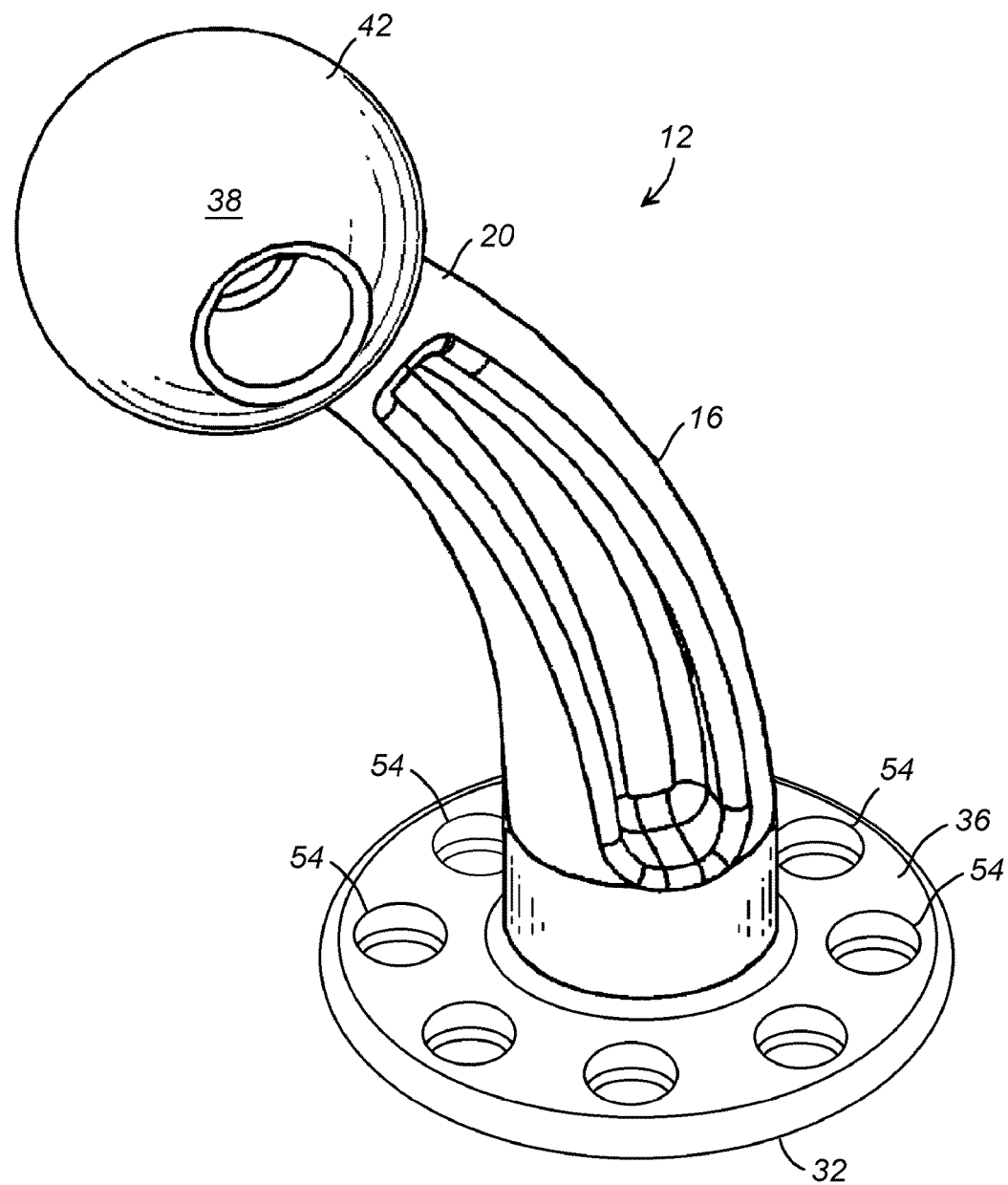
FIG. 5 illustrates one exemplary embodiment of a rigid foot structured for having the pliantly conformable mounting pad overmolded thereon.

FIG. 5 illustrates mounting base 12 having one possible embodiment of substantially rigid foot 36 adjacent to one end of column 16. Here, foot 36 is optionally formed with a plurality of apertures 54 for retaining mounting pad 32 when overmolded thereon.

Figure 7:
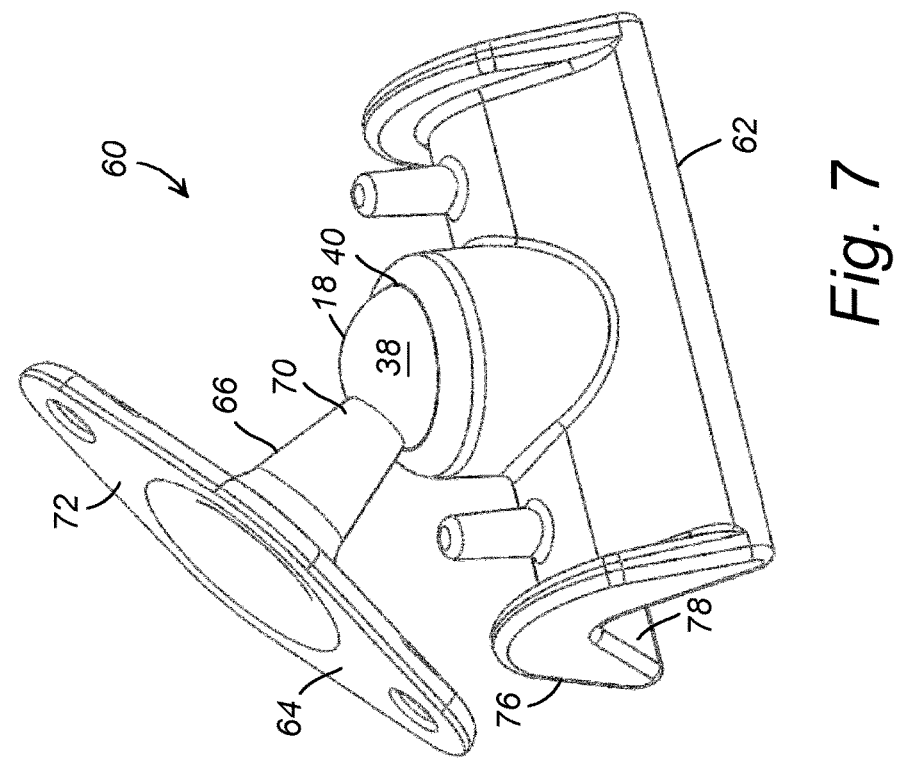
FIG. 6 and FIG. 7 are views of an alternative novel mounting apparatus having interconnectable articulated elements.
Figure 6:
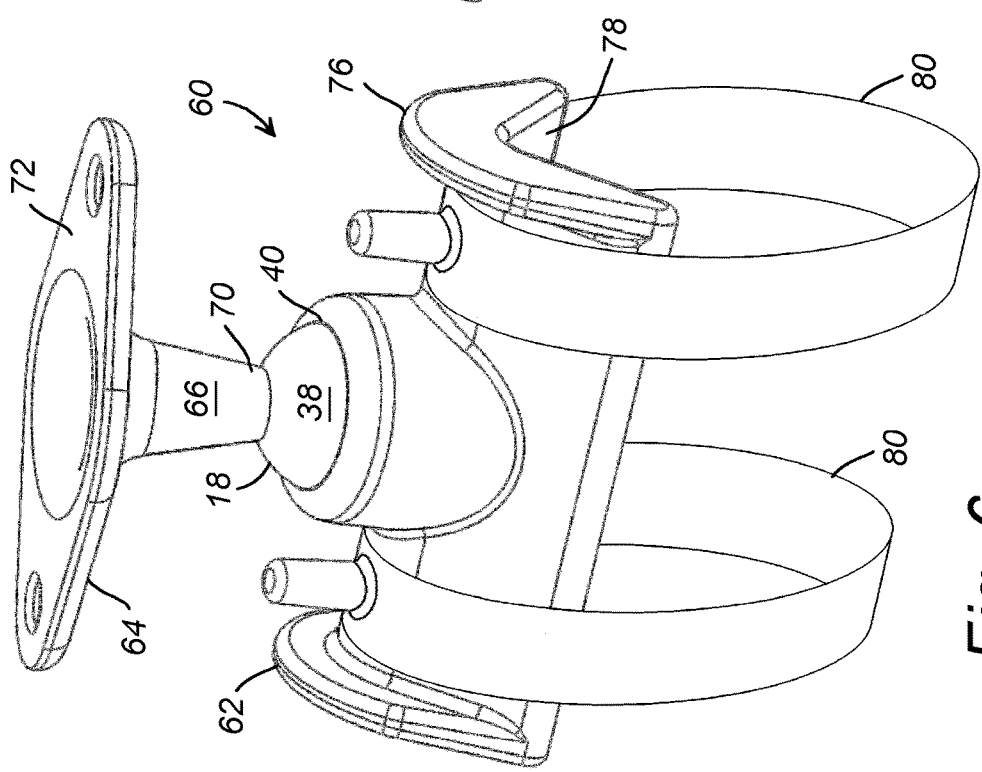

FIG. 6 and FIG. 7 are views of another novel mounting apparatus 60 having interconnectable articulated elements, the interconnectable articulated elements including a mounting base 62 adapted for mounting to a railing, and a different connector base 64. Connector base 64 is spaced away from railing mounting base 62 by a substantially rigid column 66. Ball-and-socket joint 18 is formed between mounting base 62 and connector base 64. For example, ball-and-socket joint 18 includes male ball connector 38 presented on a reduced neck portion 70 of column 66 distal from mounting base 62, and female socket 40 formed in connector base 64. FIGS. 6 and 7 illustrate mounting base 62 and connector base 64 rotated into different relative orientations by means of intervening ball-and-socket joint 18.

Connector base 64 includes a mounting plate 72 for mounting an external object 24 (shown in FIGS. 1, 2). Mounting base 62 includes a substantially rigid mounting pedestal 76 having a substantially V-shaped under surface 78 adapted for substantially conforming to a mating external rectangular or curved railing, and means 80 for coupling mounting pedestal 76 to the railing. By example and without limitation, coupling means 80 is one or more straps for wrapping around the external railing.

Figure 8:
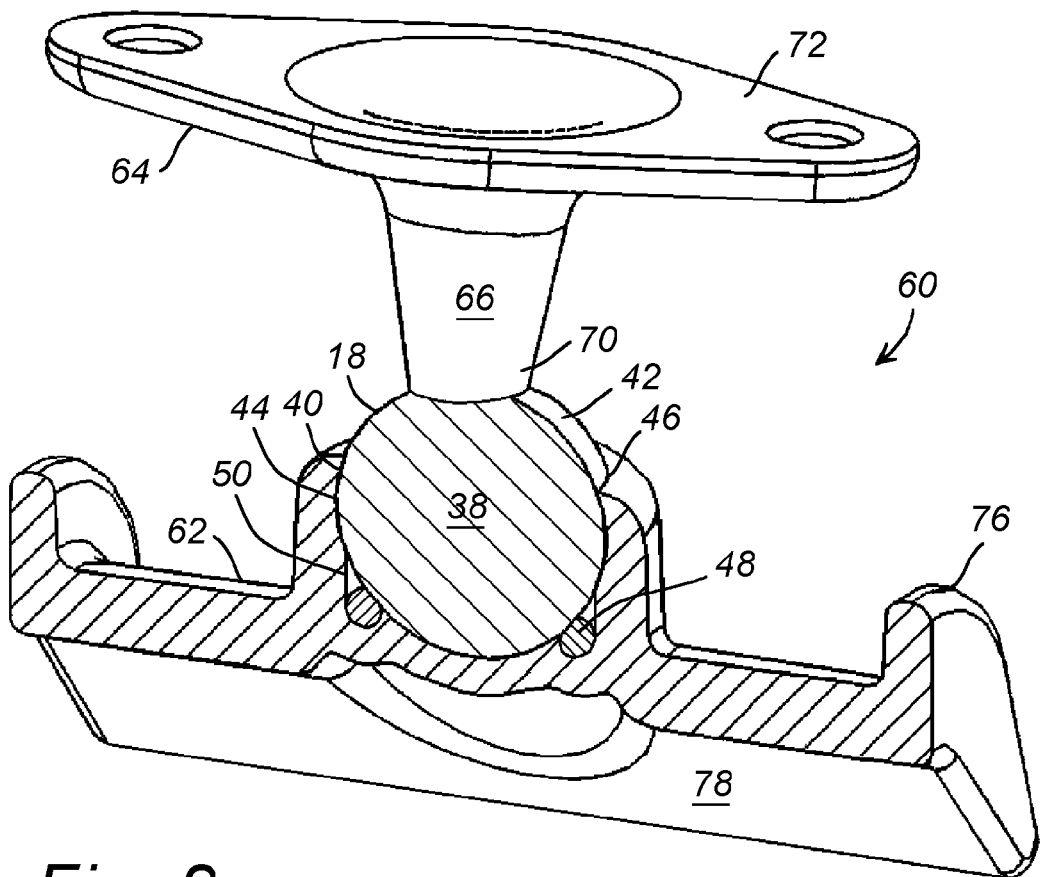
FIG. 8 is a partial cross-section view of the alternative novel mounting apparatus showing details of the ball-and-socket joint.

FIG. 8 is a partial cross-section view of novel mounting apparatus 60 showing ball-and-socket joint 18 formed between railing mounting base 62 and connector base 64. Elastically compressible o-ring or compression spring biasing member 48 is provided between male ball connector 38 and female socket 40. Biasing member 48 compresses outer surface 42 of male ball connector 38 against inner surface 44 of female socket 40. When biasing member 48 is an elastically compressible elastomeric o-ring, as shown here, surface friction between partially compressed o-ring biasing member 48 and outer surface 42 resists movement of male ball connector 38 within female socket 40.

Figure 9:
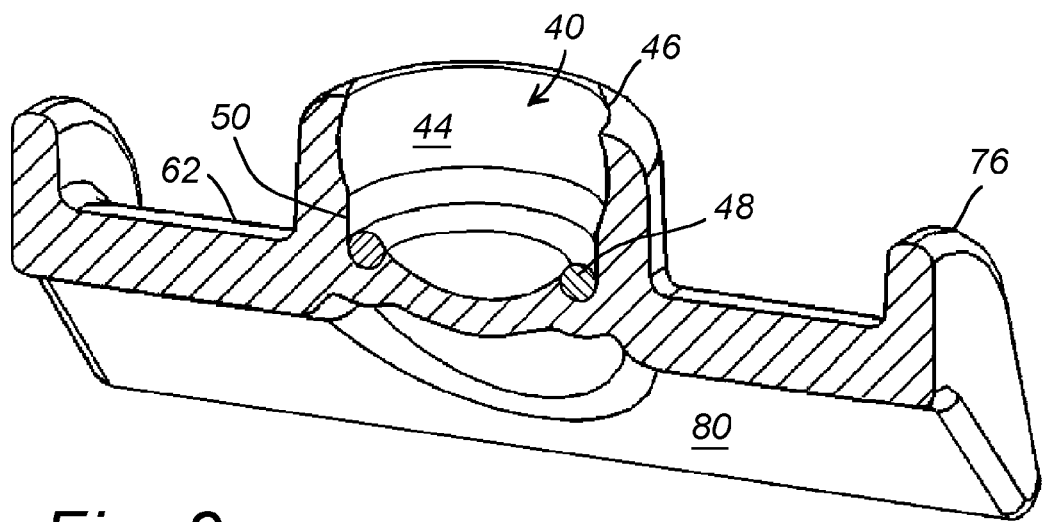
FIG. 9 is a cross-section view of a railing mounting base showing an inner surface of the female socket structured for receiving and retaining therein an o-ring biasing member.

FIG. 9 is a cross-section view of railing mounting base 62 showing inner surface 44 of female socket 40. Here, o-ring biasing member 48 is installed in seat 50 formed as a groove sized to receive o-ring biasing member 48 to a depth that retains relative positioning of o-ring biasing member 48, yet causes a portion of o-ring biasing member 48 to partially protrude into female socket 40. Accordingly, the protruding portion of o-ring biasing member 48 must be compressed by outer surface 42 of male ball connector 38 when it is engaged with female socket 40.

Additional Embodiments

Figure 10:
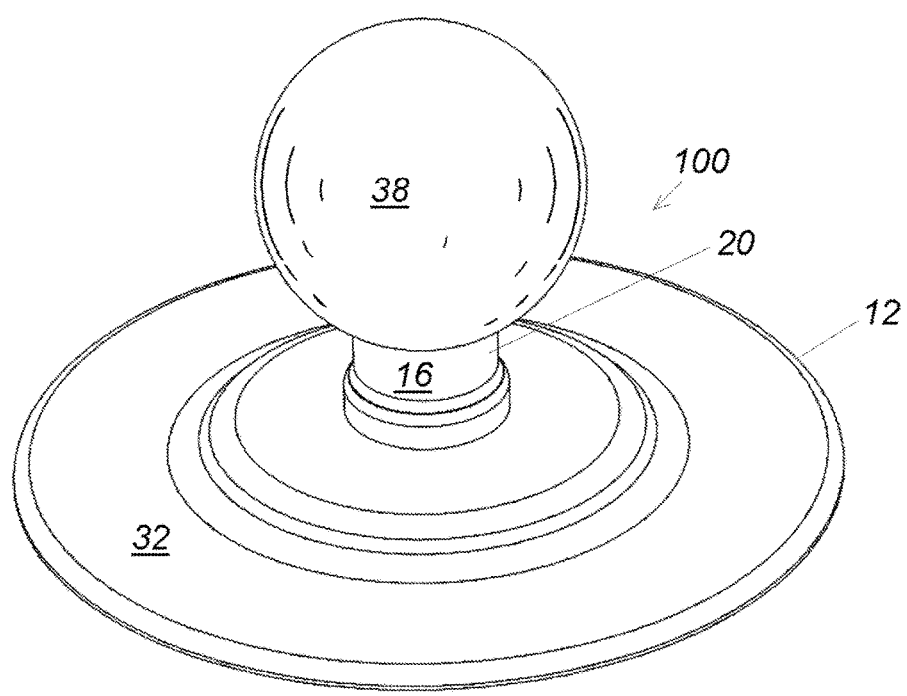
FIG. 10 is a perspective view showing an example of an alternative novel mounting apparatus having an upright stem portion projected from a transverse mounting base portion, and an elastomeric material coating is presented on an end portion of the upright stem portion opposite from the mounting base portion and forms a male ball connector having a smooth part spherical outer surface, wherein another elastomeric material coating is presented on the mounting base portion and extends outwardly transverse thereof for forming a pliantly conformable mounting pad having a smooth and substantially flat outer surface opposite from the stem portion, and an adhesive material such as a pressure sensitive adhesive, or PSA, is provided on the outer surface of the elastomeric material coating the base portion.

FIG. 10 is a perspective view showing an example of an alternative novel mounting base 100 having overmolded pliantly conformable mounting pad 32 adjacent to one end of upright column or stem portion 16, and male ball connector 38 presented on reduced neck portion 20 at other end of column 16 distal from mounting base 12.

FIG. 11 is a perspective view showing an example of an alternative novel mounting base 100 formed on one exemplary embodiment of a rigid frame 102 including upright stem portion 16 projected from a transverse mounting foot or base portion 36. Rigid frame 102 is formed of relatively rigid molded plastic. Alternatively, rigid frame 102 formed of another tough, sturdy and substantially rigid material such as a carbon fiber composite material, or else a metal such as aluminum or steel.

According to one possible embodiment of rigid frame 102, transverse mounting foot or base portion 36 is optionally formed with plurality of apertures or other gripping elements 54 as means for retaining mounting pad 32 when overmolded thereon. Other conventional retention means than plurality of apertures 54 are contemplated as means for retaining mounting pad 32 on base portion 36, such as knurling, ridges or serrations or other surface artifacts suitable as a gripping aid for retaining mounting pad 32 on base portion 36, are also contemplated and may be substituted without deviating from the scope and intent of the present invention. Alternatively, means for retaining mounting pad 32 on base portion 36 include but are not limited to ultrasonic or chemical welding, adhesive bonding, or other suitable bonding processes, which bonding processes are also contemplated and may be substituted without deviating from the scope and intent of the present invention.

Rigid frame 102 includes a rigid connector core 104 formed on an end portion 106 at reduced neck portion 20 of upright stem 16 opposite from mounting base portion 36 for male ball connector 38 thereon. Connector core 104 is substantially enlarged relative to reduced neck portion 20 of upright stem 16.

Connector core 104 is optionally formed integrally with rigid frame 102 generally, as by machining or injection molding. Alternatively, connector core 104 is a separate component from stem 16 and/or base portion 36, and is joined to end portion 106 of reduced neck portion 20 of upright stem 16 by mechanical means, such as a welded, soldered or threaded joint, or by chemical means, such as chemical or adhesive bonding. Such mechanical and chemical joining means, as well as other configurations suitable for retaining distinct connector core 104 securely on end portion 106 of upright stem 16 are considered to be equivalent configurations contemplated by the invention and falling within the scope of the invention.

Connector core 104 is substantially enlarged relative to reduced neck portion 20 of upright stem 16, and is optionally formed having a generally spherical shape. Optionally, a network of horizontal and vertical gripping elements 108 is formed in relief on an outer surface of connector core 104 as a suitable means for retaining an elastomeric material coating 110 of male ball connector 38 in position thereon. Alternatively, connector core 104 is optionally formed as a cube or another equivalent form including, for example, a disc, block, cuboid, parallelepiped, pyramid, cylinder, or sphere, each preferably knurled or formed with grooves, ridges, pockets, fingers, or other artifacts as a suitable means for retaining elastomeric material coating 110 of male ball connector 38 in position thereon. Such artifacts and other configurations suitable for retaining connector core 104 securely on upright stem 16 are considered to be equivalent configurations contemplated by the invention and falling within the scope of the invention. Such expressly disclosed configurations and other configurations suitable for retaining connector core 104 securely on upright stem 16 are considered to be equivalent configurations contemplated by the invention and falling within the scope of the invention.

FIG. 12 illustrates rigid frame 102 with elastomeric material coating 110 being presented on end portion 106 of upright stem 16, thereby forming male ball connector 38 over connector core 104 at end portion 106 of reduced neck portion 20 of upright stem 16 opposite from mounting base 12. Here, male ball connector 38 is a substantially solid mass of elastomeric material coating 110 formed at an outer surface 42 thereof as a semi-spherical mounting ball formed of a relatively resilient, pressure deformable elastomeric material. Elastomeric material coating 110 renders ball connector 38 relatively radially compressible between respective part spherical surfaces of a socket clamp coupled thereto. Such a socket clamp is disclosed by the inventor of the present invention in U.S. Pat. No. 5,885,845 entitled, *Universally Positionable Mounting Device*, issued Dec. 8, 1998, which is incorporated herein by reference. The material is optionally formed of a resilient material, such as but not limited to a nitrile rubber material. Other suitable resilient materials, including other hardened rubber and elastomer materials, may be employed. The materials of ball connector 38 may have a Shore A durometer of between about 30-100 and preferably between about 60-100. Most preferable is a Shore A durometer of about between 85-90. Ball connector 38 optionally has a Shore D hardness of between 40 and 70. Such resilient materials will permit ball connector 38 to resume its original ball shaped configuration at outer surface 42 thereof upon removal of radially compressive force applied thereto.

Figure 13:
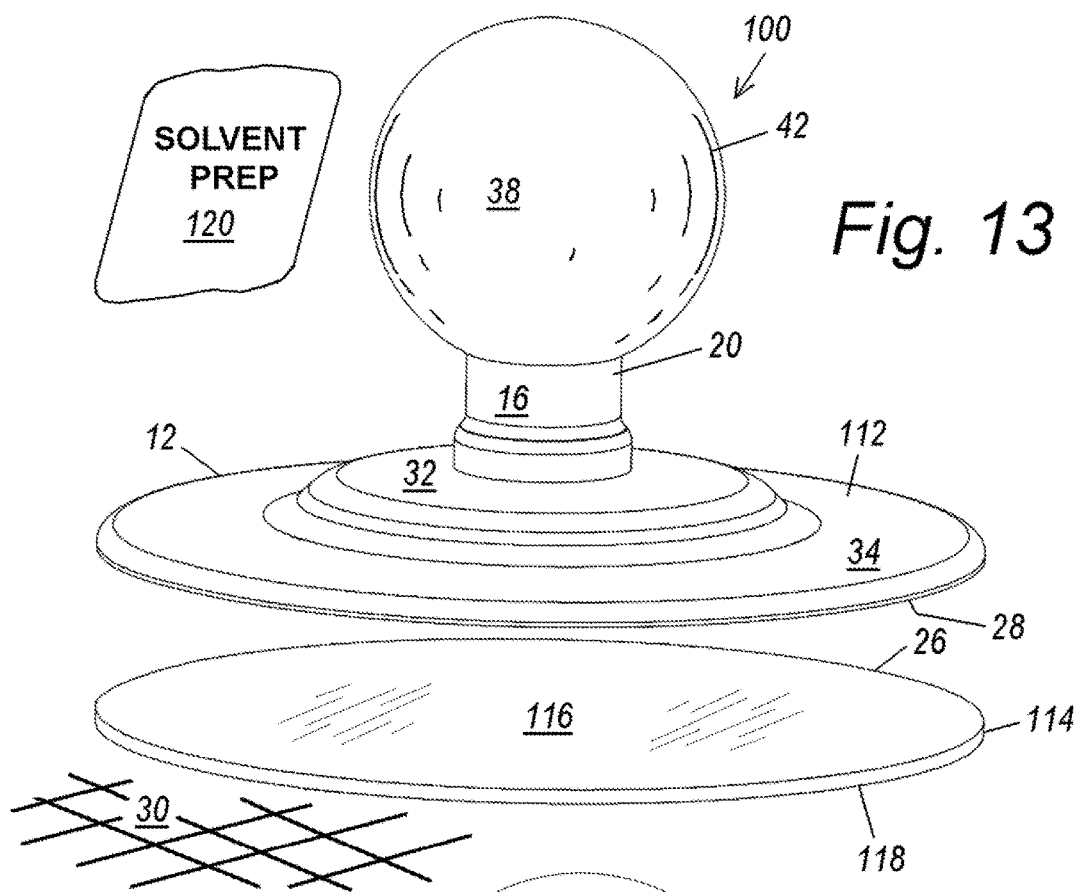
FIG. 13 illustrates the rigid frame of FIG. 11 with an elastomeric material coating being presented on the mounting base and extending outwardly transverse thereof for forming the pliantly conformable mounting pad, FIG. 13 also illustrates assembly of the alternative novel mounting base of FIG. 10.

FIG. 13 illustrates one exemplary embodiment of mounting pad 32. Here, another elastomeric material coating 112 is presented on mounting base 36 and extends outwardly transverse thereof for forming pliantly conformable mounting pad 32. For example, either mounting pad 32 is adhered to mounting base 36, or mounting pad 32 is overmolded onto mounting base 36. When mounting pad 32 is overmolded onto base portion 36, elastomeric material coating 112 is optionally retained thereon by interlocking with plurality of apertures 54 as means for retaining mounting pad 32.

Conformable mounting pad 32 is formed with pliantly conformable outer skirt portion 34 which is flexible for substantially conforming to mounting surface 30 external of mounting apparatus 100 when surface 30 is a curved or other substantially nonplanar mounting surface, such as vehicle dashboard or other nonplanar surface. When conformable outer skirt portion 34 is conformed to nonplanar external surface 30, mounting pad 32 is adhered to surface 30 by coupling means 26 on its under surface 28.

FIG. 13 also illustrates assembly of alternative novel mounting base 100, wherein conformable mounting pad 32 is formed having smooth and substantially flat outer surface 28 opposite from upright stem 16, and coupling means 26 is provided on outer surface 28 of elastomeric material coating 112 of mounting base 36 for coupling to mounting surface 30 external of mounting apparatus 100. For example, coupling means 26 is an adhesive material such as a pressure sensitive adhesive, or PSA. According to one embodiment, pressure sensitive adhesive coupling means 26 includes a conformal pad 114 separate and distinct from conformable mounting pad 32, conformal pad 114 having inner and outer surfaces 116 and 118 both coated with a pressure sensitive adhesive, with inner surface 116 being adhered to under surface 28 conformable mounting pad 32, and outer surface 118 being available for adherence to external target mounting surface 30.

Optionally, alternative novel mounting base 100 includes a cleaning apparatus 120, such as a cloth having alcohol or another cleaning solvent pre-applied thereto, is applied to prepare external target mounting surface 30 prior to attachment of conformable mounting pad 32.

Figure 14:
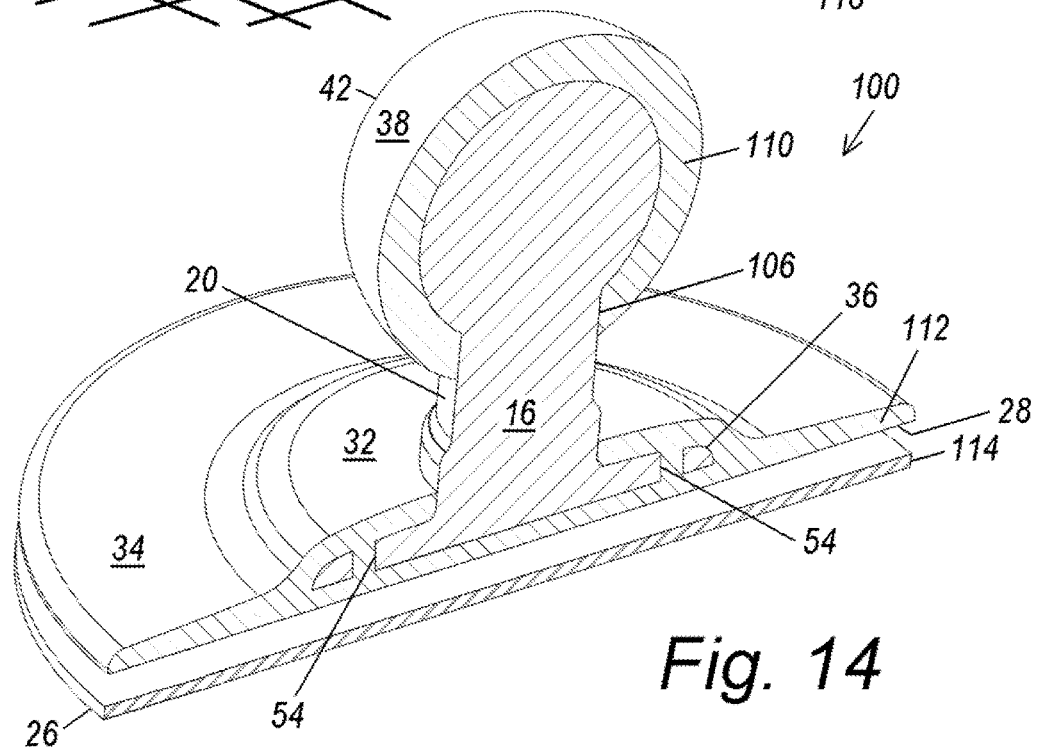
FIG. 14 is a cross-sectional of the alternative novel mounting base of FIG. 10.

FIG. 14 is a cross-sectional view showing an example of alternative novel mounting base 100 formed on rigid frame 102 having upright stem portion 16 projected from transverse mounting foot or base portion 36. Elastomeric material coating 110 is presented on end portion 106 of upright stem 16 opposite from mounting base 36 for forming male ball connector 38 formed with smooth part-spherical outer surface 42. Other elastomeric material coating 112 is presented on mounting base 36 and extends outwardly transverse thereof for forming pliantly conformable mounting pad 32, wherein mounting pad 32 is adhered to mounting base 36, or mounting pad 32 is overmolded onto mounting base 36 and retained thereon by interlocking with plurality of apertures or other gripping elements 54 therein, or retained thereon by interlocking with other conventional retention means, such as knurling, ridges or serrations or other surface artifacts suitable as a gripping aid for retaining mounting pad 32 on base portion 36.

Conformable mounting pad 32 is formed with pliantly conformable outer skirt portion 34 which is flexible for substantially conforming to target mounting surface 30 external of mounting apparatus 100 when surface 30 is a curved or other substantially nonplanar mounting surface, such as vehicle dashboard or other nonplanar surface. When conformable outer skirt portion 34 is conformed to nonplanar external surface 30, mounting pad 32 is adhered to surface 30 by adhesive coupling means 26 on its under surface 28.

Conformable mounting pad 32 is formed having smooth and substantially flat outer surface 28 opposite from upright stem 16, and coupling means 26 is provided on outer surface 28 of elastomeric material coating 112 of mounting base 36 as adhesive coupling material 26 such as a pressure sensitive adhesive, or PSA, for coupling to mounting surface 30 external of mounting apparatus 100.

While the preferred and additional alternative embodiments of the invention have been illustrated and described, it will be appreciated that various changes can be made therein without departing from the spirit and scope of the invention. Accordingly, the inventor makes the following claims.

What is claimed is:

1. A ball mount device, comprising:
    a rigid frame comprising an upright stem portion projected from a transverse base portion;
    a first elastomeric material coating an end portion of the upright stem portion distal of the base portion and forming a smooth part-spherical outer surface;
    a second conformable elastomeric material disposed around the base portion and extending therefrom in a substantially uniformly outwardly direction and forming an outer skirt comprising a smooth and substantially flat outer surface opposite from the stem portion, and
    a coupling agent provided on the outer surface of the second elastomeric material disposed around the base portion.

2. The ball mount device of claim 1, wherein the second conformable elastomeric material consists of a flexible synthetic rubber.

3. The ball mount device of claim 2, wherein the coupling agent further comprises a means for coupling the outer surface of the second elastomeric material disposed around the base portion to a surface external of the ball mount device.

4. The ball mount device of claim 1, wherein the coupling agent further comprises an adhesive.

5. The ball mount device of claim 4, wherein the adhesive coupling agent further comprises a pressure sensitive adhesive.

6. The ball mount device of claim 1, wherein the elastomeric material coating an end portion of the upright stem portion and forming a smooth part-spherical outer surface further comprises one of a substantially incompressible material, and a radially compressible elastomeric material.

7. The ball mount device of claim 6, wherein the elastomeric material coating an end portion of the upright stem portion and forming a smooth part-spherical outer surface further comprises a radially compressible elastomeric material.

8. The ball mount device of claim 1, wherein the base portion of the rigid frame further comprises one or more gripping elements structured for retaining the elastomeric material coating when overmolded thereon.

9. A ball mount device, comprising:
    a rigid frame comprising an upright stem portion projected from a circular transverse base portion, and an enlarged connector core on the upright stem portion distal of the base portion;
    a first elastomeric material disposed around the connector core distal of the base portion and forming a smooth part-spherical outer surface;
    a second elastomeric material disposed around the base portion and extending outwardly thereof in every direction and forming a flexible outer skirt extending away from the upright stem portion and comprising a smooth and substantially flat and substantially uniformly circular and flexible outer surface opposite from the stem portion, whereby the outer surface is flexible for substantially conforming the base portion to a nonplanar mounting surface external of the base portion; and
    an adhesive coupling agent provided on the outer surface of the second elastomeric material disposed around the base portion.

10. The ball mount device of claim 9, wherein the second elastomeric material further consists of a flexible synthetic rubber.

11. The ball mount device of claim 9, wherein the adhesive coupling agent further comprises a pressure sensitive adhesive.

12. The ball mount device of claim 9, wherein the connector core further comprises one or more surface gripping elements on a surface thereof and structured for retaining the elastomeric material coating when overmolded thereon.

13. The ball mount device of claim 9, wherein the base portion of the rigid frame further comprises one or more surface gripping elements on a surface thereof and structured for retaining the elastomeric material coating when overmolded thereon.

14. A ball mount device, comprising:
- a rigid non-metallic frame comprising an upright columnar stem portion projected from a circular transverse base portion, and an enlarged connector core on the upright stem portion distal of the base portion;
- a first elastomeric material molded over the connector core distal of the base portion and forming a smooth part-spherical outer surface;
- a second elastomeric material molded over the base portion and forming a substantially uniformly circular and pliantly conformable outer skirt portion extending a substantially uniform distance outwardly thereof and forming a smooth and substantially flat and circular outer surface opposite from the stem portion, whereby the second elastomeric material molded over the base portion and forming the conformable outer skirt portion are flexible for substantially conforming to a nonplanar mounting surface external of the base portion; and
- a pressure sensitive adhesive provided on the outer surface of the second elastomeric material of the skirt portion.

15. The ball mount device of claim 14, wherein the pressure sensitive adhesive further comprises a conformal pad coated with the pressure sensitive adhesive.

16. The ball mount device of claim 14, wherein each of the connector core and the transverse base portion further comprise a plurality of gripping elements structured for retaining the respective elastomeric material coating when overmolded thereon.

17. The ball mount device of claim 14, wherein the first elastomeric material molded over the connector core further comprises one of a substantially incompressible material, and a radially compressible elastomeric material.

18. The ball mount device of claim 1, wherein the second elastomeric material further consists of a flexible synthetic rubber, whereby the elastomeric material renders the base portion flexible for substantially conforming to a nonplanar mounting surface external of the base portion.

19. The ball mount device of claim 1, wherein the second conformable elastomeric material disposed around the base portion and extending outwardly thereof and forming a smooth and substantially flat outer surface opposite from the stem portion further extends outwardly transverse of the stem portion.

20. The ball mount device of claim 1, wherein the second elastomeric material disposed around the base portion and forming the outer skirt further renders the base portion flexible for substantially conforming to a plurality of different nonplanar mounting surfaces external of the base portion.

* * * * *